Figure 1:
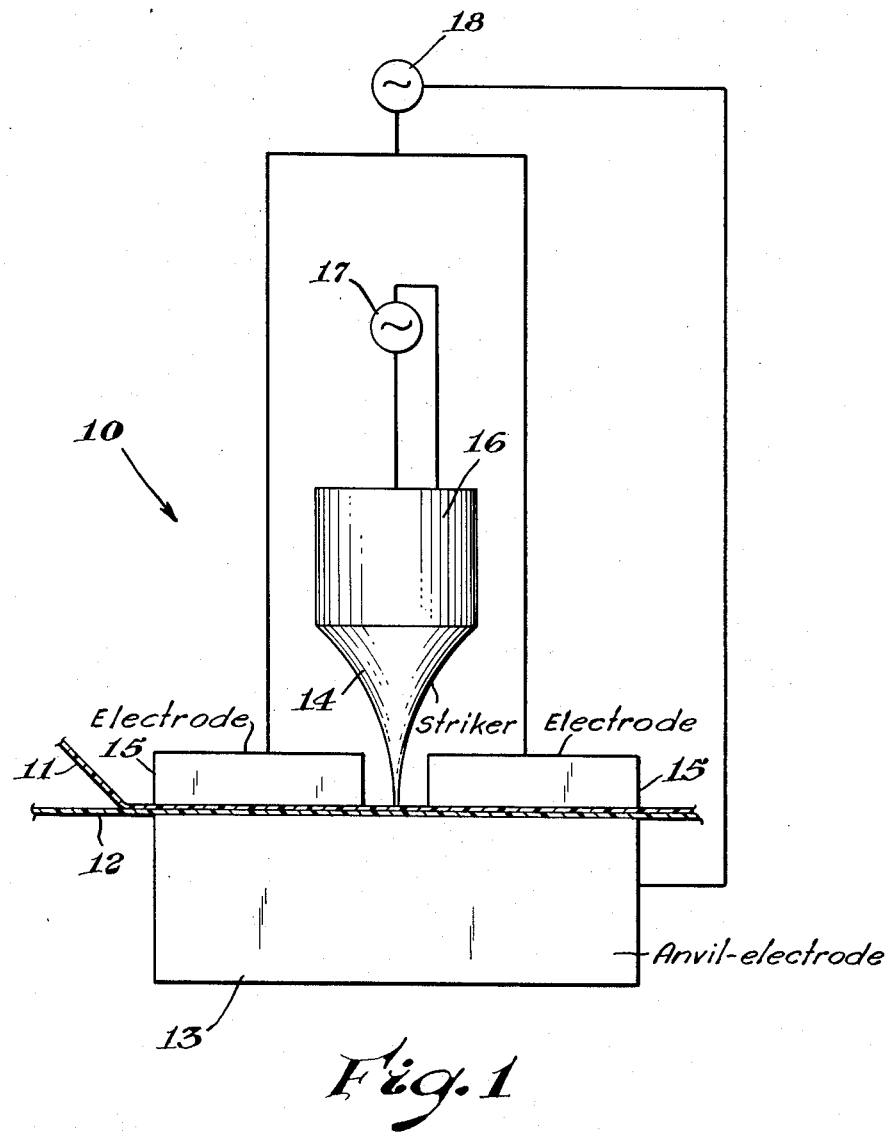

INVENTOR.
Paul C. Woodland

United States Patent Office 3,146,141
Patented Aug. 25, 1964

3,146,141
METHOD AND APPARATUS FOR EMPLOYING RADIO FREQUENCY AND ULTRASONIC OSCILLATORY ENERGY IN UNITING THERMOPLASTIC MATERIALS
Paul C. Woodland, Midland, Mich., assignor to The Dow Chemical Company, Midland, Mich., a corporation of Delaware
Filed Oct. 26, 1961, Ser. No. 147,916
9 Claims. (Cl. 156—73)

This invention relates to a method and apparatus for uniting thermoplastic materials. More specifically, it relates to an improved procedure and apparatus employing a combination of radio frequency energy and ultrasonic oscillatory energy to effect thermoplastic film welding.

The main object of this invention is to provide a method of bonding thermoplastic materials, particularly thermoplastic films, which produces high strength seals at rapid sealing rates. It is another object of the invention to enable bonding of such films, even when the surfaces are printed, dusted or contaminated by foreign substances. A further object of the invention is to provide an apparatus capable of effecting bonding by employing a combination of high frequency radio energy and ultrasonic mechanical vibration. The invention has as a still further object the avoidance of voltage rupture problems frequently encountered when radio frequency energy is the sole means used to accomplish bonding.

It has now been discovered that rapid formation of high strength thermoplastic film bonds may be accomplished by passing adjacent thermoplastic films between and in contact with an anvil-electrode member and an oppositely disposed combination of striker and electrode members. The striker is oscillated at an ultrasonic frequency and causes heat-producing inelastic distortion with simultaneous intimate contact of the films. The alternating electrical field produced by means of a radio frequency generator attached to the electrodes causes heat-producing periodic molecular reorientation within said films. The resulting bond generally possesses greater strength than bonds produced solely by the use of either ultrasonic oscillation or radio frequency energy methods of sealing.

The method and apparatus of the invention may be more fully comprehended by reference to the accompanying drawing wherein the essential elements of an apparatus suitable for production of thermoplastic film bonds in accordance with the invention are shown. Figure 1 is a schematic representation of an apparatus 10 consisting of striker means 14 affixed to a transducer 16, electrode means 15 and an oppositely disposed anvil-electrode member 13. An ultrasonic frequency generator is employed to impart mechanical vibration to the striker 14 and a radio frequency generator is employed to produce an alternating electrical field surrounding the electrodes 13 and 15.

In FIGURE 1, two sheets of thermoplastic film 11 and 12 are shown between and in contact with striker 14 and electrode 15 members and an oppositely disposed anvil-electrode member 13. An alternating radio frequency is applied to the electrodes 13 and 15 by means of a radio frequency generator 18 while an ultrasonic frequency generator 17 simultaneously imparts an oscillatory motion to the striker 14 by use of conventional means. The positioning of the striker means 14 and electrode means 15 in relation to the anvil-electrode member 13 is such that sufficient clearance is provided for passage of the films 11 and 12 being joined with the only constant pressure exerted on the film resulting from the weight of the electrodes 15. In one embodiment of the invention, the electrodes 15 are arranged, as indicated in FIGURE 1, to provide for exposure of moving films to an ambient radio frequency field immediately prior and immediately subsequent to contact with the oscillating striker. This arrangement serves the purpose of initially raising the internal temperature of the film, which facilitates more effective sealing upon the immediately following impact of the striker. When oriented films are employed, exposure of the seal area to the radio frequency field, immediately subsequent to striker impact, induces molecular vibration in the film structure which in turn allows a preferred molecular realignment. The net effect is formation of a stronger bond as a result of structural recovery from the deorientation effects of the distortion caused by striker impact.

Other arrangements of the apparatus are utilized with exposure of the films to the radio frequency field occurring only immediately prior or only immediately subsequent to striker action on the films with the choice of arrangement dependent upon the physical properties of the thermoplastic film to be sealed.

A wide variety of thermoplastic materials may be joined in the method of the invention. Some examples are: polyvinyl chloride, polyvinylidene chloride, copolymers of vinylidene chloride and vinyl chloride and of vinylidene chloride and styrene, ethyl cellulose, methyl cellulose, cellulose acetate, cellulose acetate-butyrate, chlorinated polyethylene, chlorinated polypropylene, cellulose triacetate, polyvinyl alcohol, cellophane coated with polar thermoplastics, and the like. In general, thermoplastic materials wherein the dissipation factor is greater than about 0.01 may be advantageously bonded by the method and apparatus of the invention. These materials may be pigmented, stabilized, plasticized or otherwise formulated and may vary in thickness from about 0.1 mil to about 100 mils.

Generally the optimum residence time of the films between the combination of striker and electrode members and the oppositely disposed anvil-electrode member will vary with the radio and ultrasonic frequencies utilized and the amplitude of the striker. Lower residence time is required when higher RF energies and striker amplitudes are used. The thickness and composition of the films as well as surface contamination, effective seal width and shape of the striking face and anvil working face appear to be inter-related with the power and time requirements. Usually the relationship between these variables appears to be of a rather complex nature and no precise correlation is readily apparent, although optimum radio frequencies are established for some materials by inflection points in their dielectric loss factor curves.

The striking means or hammer is generally a metallic surface that is positioned in a direction normal to the plane of the material to be joined and to the working face of the anvil-electrode. The striker may be excited electricaly by means of a conventional magnetostrictive transducer such as described in U.S. Letters Patent No. 2,803,-735, or a conventional piezoelectric transducer, such as described in the article entitled "A Barium Titanate Transducer Capable of Large Motion at an Ultrasonic Frequency," by Mason and Wick, printed in The Journal of the Acoustical Society of America, March 15, 1951.

The excitation frequency transmitted to the striking means or hammer is beneficially in the range from 15 to 500 kilocycles per second. Below 15 kilocycles per second objectionable audible noise results and above 500 kilocycles per second transducer problems are encountered. The magnitude of the oscillating vibration of the striking means is beneficially within the range of 0.0005 to 0.01 inch. When the hammer travels less than about 0.0005 inch, satisfactory sealing may be difficult to accomplish while hammer travel greater than about 0.01 inch results in a tendency to cut the thermoplastic material being sealed. The anvil-electrode has generally a smooth, rigid surface. A radio frequency generator, with a power output usually greater than about 10 watts is used to impart radio frequency energy to the electrodes in the range of from about 100 kilocycles to 200 megacycles per second.

The following examples are intended to illustrate the invention but are not to be construed as limiting thereof.

EXAMPLE 1

Two films, each 0.002 inch thick, prepared from a polymer comprising the polymerization product of a mixture of 85 parts of vinylidene chloride to 15 parts of vinyl chloride and plasticized with 5 parts of acetyl tributyl citrate, were bonded at a rate from 70 to 80 feet per minute by means of a sealing device generally as illustrated in FIGURE 1 of the schematic drawing. A piezoelectric transducer, affixed to the large, flat, circular surface of a generally conical quarter wave impedance striker was excited by means of an ultrasonic generator operating at a frequency of about 40 kilocycles per second with a total power output from the generator of about 20 watts. A radio frequency generator operating at a frequency of about 27 megacycles per second with a total power output of about 50 watts was connected to the electrodes thus placing the film area being sealed in a high frequency field. Seals were also prepared by utilization of radio frequency energy alone and of ultrasonic oscillations alone. These seals were prepared under a wide range of conditions which varied the radio frequency energy in the one case and the magnitude and rate of oscillation in the other case at various sealing rates in order to obtain maximum strength of bonding. Tensile strength of all seals was measured by applying tension within the plane of the film and perpendicular to the line of seal with the results expressed as pounds per linear inch required to rupture the seal joining the two films of 0.002 inch thickness. These seal strengths were then compared with the strength of the film itself by conducting similar rupture tests on areas of the films not exposed to the described excitation. The results of numerous tests are compiled in Table I.

EXAMPLE 2

Two films, each 0.002 inch thick, prepared from a polymer comprising the polymerization product of a mixture of 82 percent vinylidene chloride and 18 percent vinyl chloride were bonded by the method and apparatus of Example 1. Results of the tensile strength tests are shown in Table II.

*Table I*

| Method of bonding | Lbs./linear inch | | Seal strength as percent of original material strength |
|---|---|---|---|
| | Range | Average | |
| Ultrasonic oscillation | 14.0–15.5 | 14.7 | 51.7 |
| Radio frequency energy | 16.5–18.0 | 16.8 | 58.7 |
| Combination ultrasonic and radio frequency | 23.0–26.0 | 23.7 | 64.4 |

*Table II*

| Method of bonding | Lbs./linear inch | | Seal strength as percent of original material strength |
|---|---|---|---|
| | Range | Average | |
| Ultrasonic oscillation | 11.0–16.0 | 12.5 | 34.2 |
| Radio frequency energy | 11.5–15.5 | 12.3 | 35.2 |
| Combination ultrasonic and radio frequency | 18.0–20.2 | 19.0 | 55.2 |

The tensile strength values in both of the examples above represent optimum sealing conditions at the indicated sealing rates as determined experimentally. In a similar manner polymers such as polyvinyl chloride, polyvinylidene chloride, copolymers of vinylidene chloride and vinyl chloride and of vinylidene chloride and styrene, ethyl cellulose, methyl cellulose, cellulose acetate, cellulose acetate-butyrate, chlorinated polyethylene, chlorinated polypropylene, cellulose triacetate, polyvinyl alcohol, cellophane coated with polar thermoplastics, and the like, in sheets from 0.05 of a mil to 25 mils are advantageously joined in accordance with the invention.

It is intended that the foregoing specification and description be interpreted and construed as being merely illustrative of certain of the possible embodiments of the invention. In no sense or manner should limiting or restrictive considerations of the invention be entertained excepting in view of its definitions as set forth in the appended claims.

I claim:

1. A method of bonding thermoplastic films, having a dissipation factor at least about 0.01, said method comprising:
    (1) passing an area of adjacent thermoplastic surfaces of similar such films to be sealed through a field of radio frequency energy of from about 100 kilocycles to 200 megacycles per second, and
    (2) applying to said area of adjacent thermoplastic surfaces a plurality of impacts of an ultrasonic nature within the range of from about 15 to 500 kilocycles per second, until said films are joined together.

2. A method in accordance with claim 1, wherein said plurality of impacts of an ultrasonic nature are applied by a configuration oscillating over a distance of about 0.0005 to about 0.01 inch.

3. A method in accordance with claim 1, wherein said thermoplastic films are moved relative to said field of radio frequency energy and to said plurality of impacts of an ultrasonic nature to produce an elongated bond between the films.

4. A method in accordance with claim 1, wherein said thermoplastic films each comprise the copolymerization product of 82–85 parts vinylidene chloride and 18–15 parts vinyl chloride.

5. A method in accordance with claim 1, wherein said thermoplastic films are, in rapid sequence, first exposed to said radio frequency energy, then acted upon by said plurality of impacts of an ultrasonic nature followed by a second exposure to said radio frequency energy.

6. A method in accordance with claim 1, wherein said film is an oriented thermoplastic resinous film.

7. An apparatus for bonding thermoplastic films which have a dissipation factor at least about 0.01, said apparatus comprising in cooperative combination a support means carrying an anvil-electrode member, the anvil-electrode member having an anvil working face oppositely disposed and adjacent to a striking means having a striking face, said faces adapted to cooperatively engage thermoplastic sheet material positioned therebetween; said striking means being connected in operative relationship with an ultrasonic frequency generator means; said anvil-electrode member being in cooperative relationship to electrode means adjacent to said striking face, said electrode means oppositely disposed and in close relationship to said anvil-electrode and separated therefrom by a space to accommodate said sheet material to be sealed.

8. The apparatus of claim 7, wherein said ultrasonic frequency generator is adapted to supply power at a frequency from about 15 kilocycles per second to about 500 kilocycles per second and said anvil-electrode and oppositely disposed electrode means are in cooperative association with a radio frequency generator adapted to supply power at a frequency from about 100 kilocycles per second to about 200 megacycles per second.

9. The apparatus of claim 7, wherein said electrode means adjacent to said striking face comprise electrodes spaced from and on opposite sides of said striking means.

References Cited in the file of this patent

UNITED STATES PATENTS

| 2,522,082 | Arnold | Sept. 12, 1950 |
| 2,671,264 | Pessel | Mar. 9, 1954 |
| 2,984,903 | Dixon et al. | May 23, 1961 |

FOREIGN PATENTS

| 744,591 | Great Britain | Feb. 8, 1956 |
| 857,860 | Great Britain | Jan. 4, 1961 |
| 33-9142 | Japan | Oct. 14, 1955 |